US012739230B2

(12) United States Patent
Ramisetty et al.

(10) Patent No.: US 12,739,230 B2
(45) **Date of Patent: *Sep. 15, 2026**

(54) DATA FEDERATION SYSTEMS AND METHODS

(71) Applicant: METROPOLITAN WASHINGTON AIRPORTS AUTHORITY, Washington, DC (US)

(72) Inventors: Satyanarayana Ramisetty, Washington, DC (US); Dhamotharakkannan Seenivasagam, Washington, DC (US); Goutam Kundu, Washington, DC (US); Sarathy Chelladurai, Washington, DC (US); Someshwar Gotike, Washington, DC (US); Kevin Poplar, Washington, DC (US); Sushant Gulati, Washington, DC (US)

(73) Assignee: METROPOLITAN WASHINGTON AIRPORTS AUTHORITY, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/257,625

(22) Filed: Jul. 2, 2025

(65) Prior Publication Data

US 2025/0343783 A1 Nov. 6, 2025

Related U.S. Application Data

(63) Continuation of application No. 18/884,750, filed on Sep. 13, 2024, now Pat. No. 12,375,453.

(Continued)

(51) Int. Cl.
*H04L 9/40* (2022.01)
*G06F 3/14* (2006.01)
*G06F 16/27* (2019.01)

(52) U.S. Cl.
CPC ........ *H04L 63/0272* (2013.01); *G06F 3/1423* (2013.01); *G06F 16/27* (2019.01)

(58) Field of Classification Search
CPC ..... G06F 16/27; G06F 3/1423; H04L 63/0272
See application file for complete search history.

(56) References Cited

U.S. PATENT DOCUMENTS 11,100,217 B1 * 8/2021 Natanzon ............ H04L 63/1433
2017/0169528 A1 * 6/2017 Kundu ................. H04L 65/765

* cited by examiner

*Primary Examiner* — Deeprose Subedi
(74) *Attorney, Agent, or Firm* — Maier & Maier, PLLC

(57) ABSTRACT

A smart display system for displaying content on multiple display screens. Execution of the computer program instructions by one or more processor implements modules, servers, databases, components, and services, in which a (MUFID) Services module is: operatively associated with a smart display services module; operatively associated with a Smart Data Entry module; and operatively associated with a smart display frontend module. An OAG provides realtime flight data. An Information Integrator component provides smart display MUFID services for fetching the flight data from the OAG and storing the flight data into a My SQL database. An Open Integrator Hub component provides smart display services, which contain business logic to manage flight content and reads the flight data from the My SQL database and provides realtime changes to a Smart Display Admin App. The one or more processor controls the multiple display screens to display content.

28 Claims, 9 Drawing Sheets

Related U.S. Application Data

(60) Provisional application No. 63/627,018, filed on Jan. 30, 2024.

Managing Arrivals

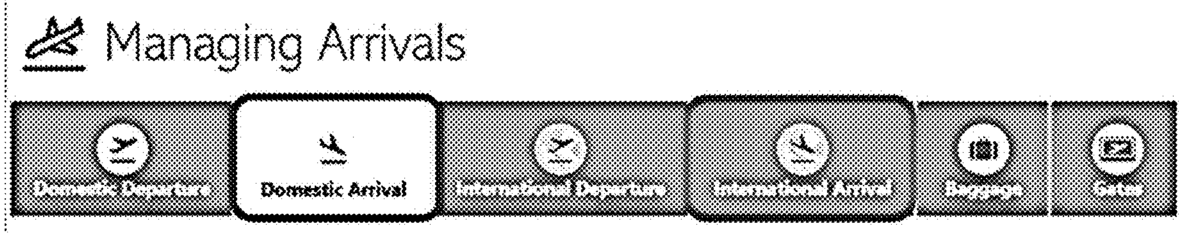

1. From the Manage Flight Displays module, click on either the Domestic Arrival or International Arrival tab to access your flight.
2. In the table, click on the row for your flight.
3. The Edit Flight window pops up. Edit the flight details here as needed.
4. Click the Save button to commit the changes.

Note the following:

- Actual Time: edit to reflect a new arrival time
- Status: select a new flight status from the dropdown list
- Arrival Gate: edit to reflect a new gate assignment.
- Claim 1, 2, and 3: edit with the assigned baggage belt numbers.

FIG. 7

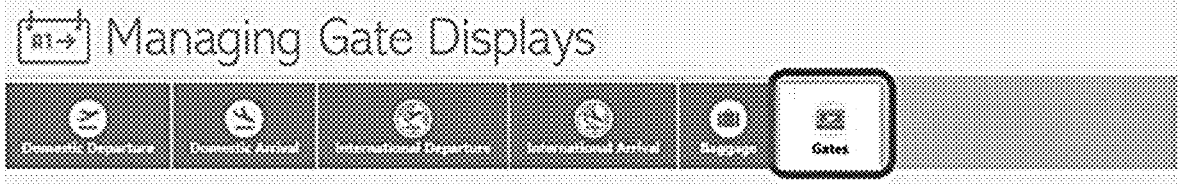

Airlines can control when their flight information is displayed on GIDS screens by creating flight rules to override the system default parameters.

The default system parameters are:

- Display Start Time: international flights begin displaying 5 hrs before departure; domestic flights begin displaying 4 hrs prior to departure.
- Display End Time: international flights cease displaying 20 minutes after departure; domestic flights cease displaying 10 minutes after departure.

To override these settings, create your own Gate Config rule for a flight:

1. From the Manage Flight Displays in the main menu, click on the Gates tab.
2. Click on the Add button (or click the row corresponding to the existing gate configuration you wish to edit).
3. Input / edit the fields in the Flight Gate Config window as needed.

Note the following:

- Start Time: input a number representing minutes prior to departures.
- End Time: enter a number representing minutes following arrival.
- Up to two codeshares can be entered. Use the fields Code Share - Code 1, Code Share-Number 1 for the first.

4. Click the Save button to commit the changes.

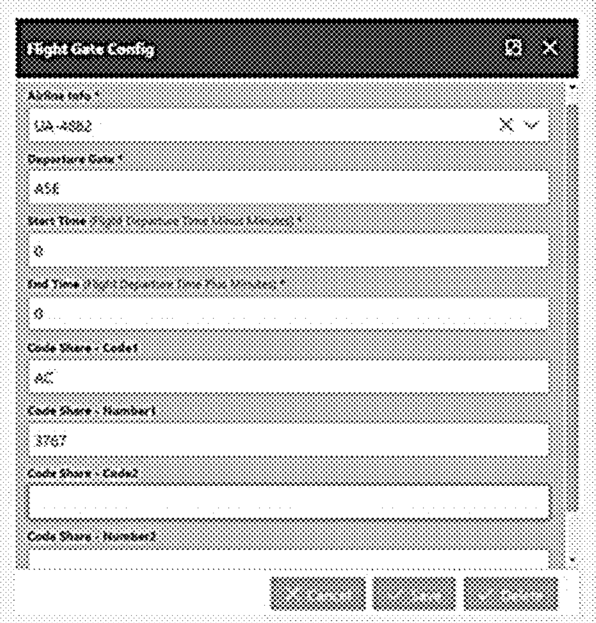

FIG. 8

DATA FEDERATION SYSTEMS AND METHODS

CROSS-REFERENCE TO RELATED APPLICATION

This application is a continuation of U.S. patent application Ser. No. 18/884,750, filed on Sep. 13, 2024, which claims the benefit of priority of U.S. Provisional Patent Application No. 63/627,018, titled "Smart Display," filed on Jan. 30, 2024. The contents of these applications is incorporated herein in its entirety by reference.

TECHNICAL FIELD

The present invention relates generally to a system and method for distribution and delivery of media content and other data to airport or other facility users, employees, and vendors, and more particularly to an integrated distribution system that collects data from multiple feeder sources and send content to multiple display screens.

BACKGROUND

Electronic signs are prevalent in places where the public needs instructions and directions, and where advertisers want to reach a wide and sometimes traveling audience. Historically, each type of airport sign, for example, was provided and maintained by a different vendor, and each solution had completely different combinations of displays, hardware, software, networking, and operating systems within its environment. Systems were PC-based, client-server systems, each with its own architecture. Some systems using end point devices that served as the media player, daisy chained together, creating single points of failure. These systems are further missing HA, licensing capabilities, and monitoring capabilities such as system health checks and/or alerts. Functionality was limited at best and disjointed across the different systems, with no integration between any of them. Operating the digital signs also entailed multiple manual processes.

Such a disparate environment created many business challenges. Inconsistent data: each existing system fed off different data feeds, resulting in data discrepancies. Further compounding this issue, websites and mobile apps typically operated separately, introducing inconsistencies between all 3 channels. Cost and resource inefficiencies: each duplicative system required its own servers, associated licensing requirements, support, and connectivity. Furthermore, backend systems were tightly coupled with the front-end display systems, forcing any upgrade to require an overhaul of both systems. Unreliable uptime: the old environment experienced frequent outages due to reliance on poor network connectivity and design. Business users complained often of blacked out screens that displayed critical flight information. Security risks: the prior environment lacked any enterprise security standards or controls. Each system was administered differently, with major user access control and change management issues. Lost revenue opportunities: because the Airports did not truly have ownership over their vendor-managed signage systems, the unutilized digital real estate represented significant missed opportunities in non-aeronautical revenue.

Different vendors provide information to multi-use flight information displays, information such as departure times, arrival times, and gate information as non-limiting examples. Problems arise because content between vendors is not unified, and information is not disseminated across all airport screens. Emergency displays are not coordinated or even necessarily provided, particularly with reach across any national system of airports or travel centers. These displays further lack connectors to other external and/or internal emergency systems.

Perhaps the most compelling business driver is public safety. In today's global environment, airports and other travel centers have time and again ended up as ground zero for crisis scenarios. Public safety is paramount to operators of airports and other travel centers and other facilities where people need information at glance. Any lack of an efficient, coordinated emergency response puts the public at risk and our facilities in legal and reputational jeopardy. The lack of a unified digital display environment has handcuffed efforts toward the ability to quickly and centrally disseminate critical information to the traveling public.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a smart display system for displaying content on multiple display screens, the smart display system includes: multiple display screens; one or more processor operatively connected to the multiple display screens; and at least one of a memory device and a non-transitory storage device storing computer program instructions executable on the one or more processor. Execution of the computer program instructions by the one or more processor configures the one or more processor to implement modules, servers, databases, components, and services, in which a multi-user flight information display (MUFID) Services module is operatively associated with a smart display services module, operatively associated with a Smart Data Entry module, and operatively associated with a smart display frontend module. A data provider, for example but not limited to an official airline guide (OAG) provides timely and actionable realtime flight data. An Information Integrator component provides smart display MUFID services for fetching the flight data from the OAG and storing the flight data into a relational database such as, for example, a My SQL database. An Open Integrator Hub component providing smart display services, which contain business logic to manage flight content and reads latest flight data from the My SQL database and provides realtime changes to a Smart Display Admin App called Smart Data Entry and Smart Display App. One or more processor controls the multiple display screens to display content comprising at least a portion of the flight data.

In some examples, a Smart Display System Architecture includes a System Architecture on AWS, and an AWS infrastructure comprises a primary site and at least one disaster recovery (DR) site.

The smart display system may further include, installed on a primary site: a Route 53 component, wherein the Route 53 providing scalable DNS service used to route incoming traffic to the appropriate services running in EKS, the Route 53 component providing DNS resolution for Kubernetes services running in an EKS cluster, wherein end devices send the request to a request recipient component; an Amazon Elastic Kubernetes Service (EKS) cluster component, wherein the EKS is a fully managed Kubernetes service that makes it easy to deploy, manage, and scale containerized applications, wherein the EKS cluster component hosts the Kubernetes resources such as pods, services, and deployments that are used to run the application, the EKS worker nodes are distributed across 3 AZs for high availability and fault tolerance, the Smartdisplay app services are deployed to the EKS cluster component; an Amazon Virtual Private Cloud (VPC) component, the VPC component is a logically isolated network within an AWS cloud that enables the user to launch AWS resources into a virtual network, the VPC component provides a secure and private environment to run the EKS cluster component and RDS instance; a Multi-AZ Aurora MySQL RDS component provides a highly available database service that automatically replicates data across multiple Availability Zones (AZs) in a region, the multi-AZ Aurora MySQL RDS, wherein if one instance fails, traffic is automatically redirected to the standby instance without any noticeable impact to the application's availability; and a Load Balancer component comprising said recipient component, the Amazon Elastic Load Balancer (ELB) automatically distributes incoming traffic across multiple targets to improve the availability and scalability, the ELB used to distribute incoming traffic to the EKS cluster component instances running smart display app services.

The end devices may include Chromeboxes and BrightSign players. These descriptions are not limited to a single media type player (google Chromebook, etc.) and are player agnostic except where particular examples are provided, and these are provided as non-limiting examples.

Duplicate components may be installed on the at least one DR site, and an EKS cluster node group may have only a single node, which can be scaled up on demand, and an aurora RDS on the at least one DR site can be a single AZ read replica from an aurora on an RDS Primary.

The smart display system may further include an On Premise System Architecture including a MySQL database, a Netscaler Load Balancer, an application server, a continuous integration (CI/CD) server such as, for example but not limited to a Jenkins and media Servers. In at least one example: a NodeJS application running on the application server constantly pulls flight data from a data provider, for example but not limited to an OAG and a population within MySQL; the Jenkins Server polls a gitlab server for change and deploy smartdisplay apps into application servers; and a Netscaler is used to distribute requests from end devices to the smartdisplay apps running on applications Servers, and Media files are serving from Media Servers.

In some examples, the one or more processor controls the multiple display screens to display at least one of flight information display system (FIDS) information, gate information display system (GIDS) information, and baggage information display system (BIDS) information.

The smart display system may be deployed at least in part on an AWS environment; and the smart display services are integrated with an external system, which may include Aquia as a non-limiting example.

In some examples, a smart data entry application permits at least two different types of user authentication comprising, for example but not limited to: one in which the smart data entry application can integrate with Azure; and another based on a database login. It may be understood that in other embodiments any number of other IDP integrations may be utilized in addition or instead of Azure and database logins.

In at least one embodiment, a smart display system for displaying content on multiple display screens. The smart display system includes: multiple display screens; one or more processor operatively connected to the multiple display screens; and at least one of a memory device and a non-transitory storage device storing computer program instructions executable on the one or more processor. Execution of the computer program instructions by the one or more processor configures the one or more processor to display content on the multiple display screens via: an official airline guide (OAG) cloud from which a Smart Display service pulls data, uploading to MySQL database hosted on AWS (MWAA cloud instance) and from there the Smart Display services send the data to Smart Display screens an AWS cloud connected to a Digital Display System module, the OAG cloud comprising OAG flight schedule data, the OAG cloud connected to an information integrator module within the AWS cloud and having Basic Auth services, wherein the AWS cloud comprises a MySQL OAG logical store connected to the information integrator module; an Open Integration Hub having a RESTFUL API within the AWS cloud and operatively connected to the MySQL for data crud and to at least one external cloud service; an Azure Groups module within the AWS cloud operatively connected through a crud interface to the Open Integration Hub, the Azure Groups module operatively connected to an external Azure cloud having auth and role services; and a Smart Display App module within the AWS cloud and operatively connected to the Open Integration Hub for transmitting flight data and to the Digital Display Systems module for transmitting content to the display screens, and a Smart Display Admin App within the AWS cloud for managing communications with the Azure Groups.

The smart display system may further include a Smart Display System Architecture that includes a System Architecture on AWS, and an AWS infrastructure comprises a primary site and at least one disaster recovery (DR) site.

The smart display system may further include, installed on a primary site: a Route 53 component, wherein the Route 53 providing scalable DNS service used to route incoming traffic to the appropriate services running in EKS, the Route 53 component providing DNS resolution for Kubernetes services running in an EKS cluster, wherein end devices send the request to a request recipient component; an Amazon Elastic Kubernetes Service (EKS) cluster component, wherein the EKS is a fully managed Kubernetes service that makes it easy to deploy, manage, and scale containerized applications, wherein the EKS cluster component hosts the Kubernetes resources such as pods, services, and deployments that are used to run the application, the EKS worker nodes are distributed across 3 AZs for high availability and fault tolerance, the Smartdisplay app services are deployed to the EKS cluster component; an Amazon Virtual Private Cloud (VPC) component, the VPC component is a logically isolated network within an AWS cloud that enables the user to launch AWS resources into a virtual network, the VPC component provides a secure and private environment to run the EKS cluster component and RDS instance; a Multi-AZ Aurora MySQL RDS component provides a highly available database service that automatically replicates data across multiple Availability Zones (AZs) in a region, the multi-AZ Aurora MySQL RDS, wherein if one instance fails, traffic is automatically redirected to the standby instance without any noticeable impact to the application's availability; a Load Balancer component including said recipient component, the Amazon Elastic Load Balancer (ELB) automatically distributes incoming traffic across multiple targets to improve the availability and scalability, the ELB is used to distribute incoming traffic to the EKS cluster component instances running smart display app services.

The end devices may include Chromeboxes and Bright-Sign players.

Duplicate components may be installed on the at least one DR site and an EKS cluster node group may have only a single node, which can be scaled up on demand, and an aurora RDS on the at least one DR site maybe a single AZ read replica from an aurora on an RDS Primary.

In some examples, the Route 53 component is configured with program instructions executable on a processor to provide automatic failover in case of a service outage or failure, the EKS cluster component is configured with program instructions executable on a processor to run containers in a scalable and fault-tolerant way, the VPC component is configured with program instructions executable on a processor to provide a secure and private environment to run the EKS cluster component and RDS instance, and the RDS component is configured with program instructions executable on a processor to provide automatic scale storage and compute resources as the application workload grows.

In some examples, each instance of the AWS cloud contains at least one region, and each region includes at least one VPC component, each VPC component containing multiple availability zones, each availability zone having a public subnet with an EKS worker node, and a private subnet with an Amazon RDS, the smart display system operatively connected to feed data to the public subnets, each EKS worker node feeding data to at least one private subnet, the private subnets each in operative communication with the other private subnets across regions and across clouds.

The smart display system may further include an On Premise System Architecture comprising a MySQL database, a Netscaler Load Balancer, an application server, a Jenkins Server and media Servers, wherein: a NodeJS application running on the application server constantly pulls flight data from the OAG and a population within MySQL; the Jenkins Server polls a gitlab server for change and deploy smartdisplay apps into application servers; and a Netscaler is used to distribute requests from end devices to the smartdisplay apps running on applications Servers, and Media files are serving from Media Servers.

The content transmitted to the multiple display screens may include at least one of, for example, flight information display system (FIDS) information, gate information display system (GIDS) information, and baggage information display system (BIDS) information. In other embodiments any number of other display system information may be transmitted, for example media content, ads content, directional information, etc.

A smart data entry application may permit at least two different types of user authentication comprising: one in which the smart data entry application can integrate with Azure; and another based on a database login.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

FIG. 7 is a screenshot of a Manage Arrivals GUI according to at least one embodiment.

FIG. 8 is a screenshot of a Manage Gate Displays GUI according to at least one embodiment.

DETAILED DESCRIPTIONS

Figure 1:
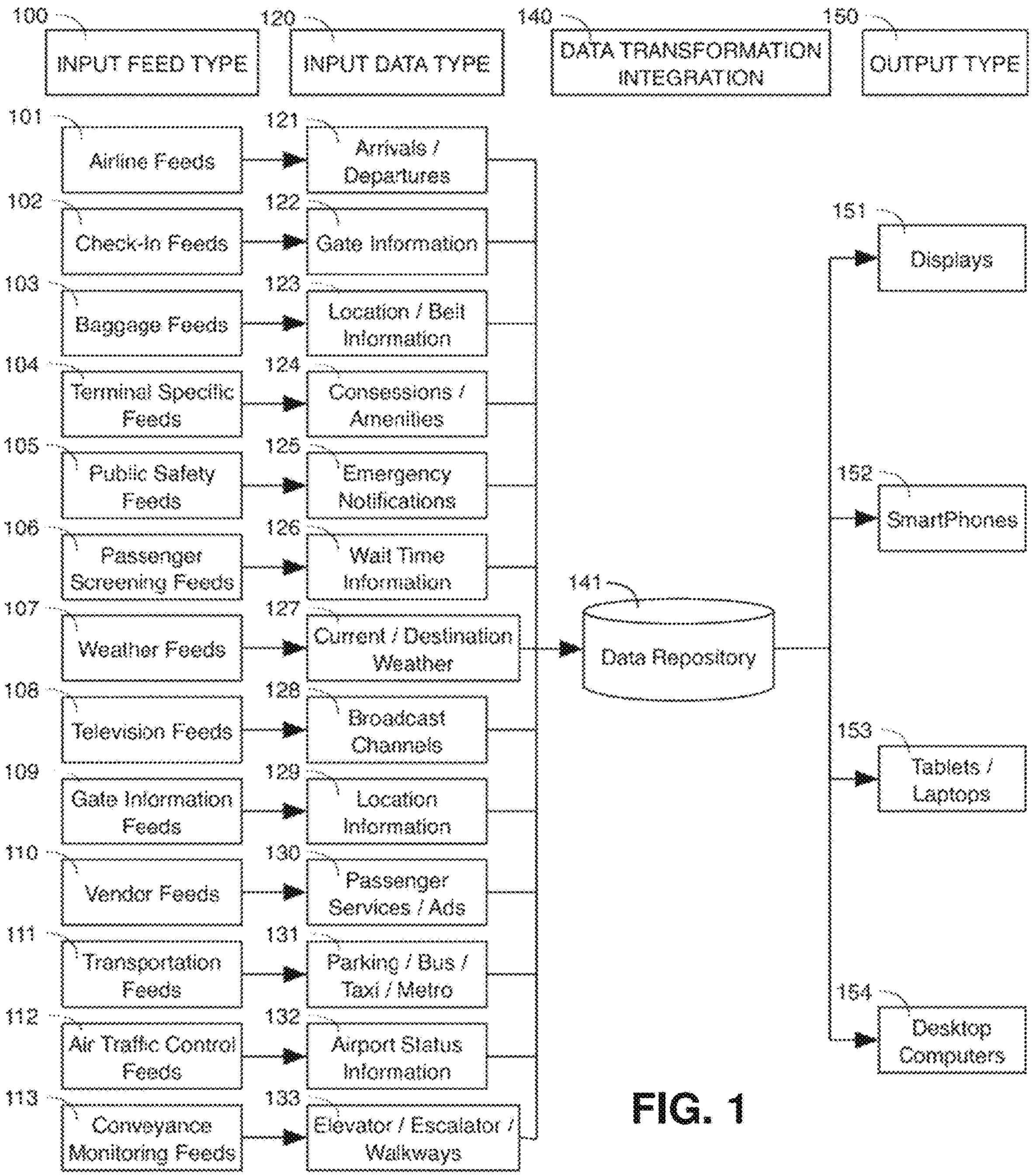
FIG. 1 is a graphic flowchart illustrating real-time data feeds from multiple airport systems logically connected to a central data collection node equipped with database storage and maintenance tools, and with a data decoupling module for processing and converting the real-time data feeds and distributing the filtered device-modified special purpose output data feed to displays and user equipment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Any materials described are provided as non-limiting examples except where their inclusion is positively and unambiguously asserted. Once materials and arrangements are described herein with reference to any structures and elements thereof, for example in the drawings, such descriptions apply as well to any further same or similar structures and elements that may appear in other drawings.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains.

The embodiments described herein relate generally to computer software and hardware enabled processes and systems and in particular to an integration engine for a smart display, especially for an airport or other multi-database system, that federates data sources to be accessible as custom outputs.

The embodiments described herein are directed to an integration engine for a smart display that utilizes data federation as a novel software and hardware enabled process to allow multiple databases to function as one. The virtual database takes data from a range of sources and converts them to a common model providing a single source of data for front-end applications as part of a data virtualization framework.

The smart display centralizes the management and operations of an airport's entire range of digital display systems. Stakeholders can easily manage, configure, update and customize their digital content across different display systems through a single integrated platform. For passengers, it ensures accurate travel information across their airport journey and ease of wayfinding. For our airlines, it enables a mobile workforce and simple, intuitive management and customization of content. And for us, the airport, the system enables many new capabilities and insights in airport ops, revenue, and public safety.

In some embodiments, one central data source disseminates content across all airport screens, of which there may be thousands, for example two thousand. Different vendors provide information to multi-use flight information displays via a central data source, information such as departure times, arrival times, and gate information as non-limiting examples. Content among vendors is unified, and information is disseminated across all screens at participating airports. Emergency information dissemination and display thereof is coordinated, with reach across any municipal, state, national, and/or international system of airports and/or travel centers.

In some embodiments directory information may be further incorporated into the system. Directories and maps can be incorporated with or by an external directory provider and even external systems still tie into same emergency management system according to at least one embodiment.

A mobile lounge display can be incorporated into the same smart display system, including a wayfinding system (e.g. train or troller system, for example for concourse to concourse, and gate to gate travel).

A unified dynamic display is provided, in which a single input of each data or source type may provide content. The system or its providers can switch out a data provider without conflicting data sources. Two-way communication with providers is enabled. The smart display system can override data (e.g. with regards to flight departure) and can back-feed that data to the provider.

The smart display system integrates with external emergency systems. Other entities (for example operators of airline lounges) may want access to the system and can subscribe to use the data or disseminate content.

The smart display system can display output in any form and for any reason, for example for security reasons.

In some embodiments, hardware and software are decoupled, providing the potential to offer the software as a SaaS product to other entities regardless of what hardware they use.

Aspects of the display can be customized independent from the input. For example, font size based on screen size can be customized to serve varieties of information independent of from where that information came. The display may further be customized even between various display outputs, for example dependent on screen size or medium, even where the content is the same.

Thus, the system is dynamic, flexible, can be completely cloud based, and is scalable.

FIG. 1 is a graphic flowchart illustrating real-time data feeds from multiple airport systems logically connected to a central data collection node equipped with database storage and maintenance tools, and with a data decoupling module for processing and converting the real-time data feeds and distributing the filtered device-modified special purpose output data feed to displays and user equipment. FIG. 1 shows how the disparate data feeds have been aggregated and converted to device-based feeds.

Input feed types 100 may include one or more external data streams or feeds. In one embodiment, the feeds include airline feed data 101, check-in feed data 102, baggage feed data 103, terminal specific feed data 104, public safety feed data 105, passenger screening feed data 106, weather feed data 107, television feed data 108, gate information feed data 109, vendor feed data 110, transportation feed data 111, air traffic control feed data 112, conveyance monitoring feed data 113, and other related data.

The airline feed data 101 received from an airline includes arrival and departure data 121 directly from the airline and formatted as received from the airline. This external airline feed data is structured and transmitted in a secured and/or proprietary format appropriate for the secure and timely delivery of airline data to an airport, and as such, needs to be mapped (M) and extracted (E), re-coded (C), and validated (V) before the data is transmitted as MECV airline data to the Data Repository 141.

The check-in feed data 102 received from the airline check-in desk includes gate information 122 from the airline or a proxy. This external check-in feed data is structured and transmitted in a secured and/or proprietary format appropriate for the secure and timely delivery of check-in data to airport systems, airlines, and related parties, and as such, needs to be mapped, extracted, re-coded, and validated before the data is transmitted as MECV check-in data to the Data Repository 141.

The baggage feed data 103 received from the airport baggage system includes baggage location and belt information 123 from the airport baggage system or a proxy. This baggage data may include, for example, both airport-generated data and airline information. This external baggage feed data is structured and transmitted in a secured and/or proprietary format appropriate for the secure and timely delivery of baggage data to airport systems, airlines, and related parties, and as such, needs to be mapped, extracted, re-coded, and validated before the data is transmitted as MECV baggage data to the Data Repository 141.

The terminal-specific feed data 104 received from the airport terminal system includes concessions and amenities information 124 from the airport terminal system or a proxy. This external terminal-specific feed data is structured and transmitted in a secured and/or proprietary format appropriate for the secure and timely delivery of concessions and amenities information to airport systems, airlines, and related parties, and as such, needs to be mapped, extracted, re-coded, and validated before the data is transmitted as MECV terminal-specific data to the Data Repository 141.

The public safety feed data 105 received from the airport public safety system includes real-time emergency notification information 125 from the airport public safety system, first responder system, or a proxy. This external public safety feed data is structured and transmitted in a secured and/or proprietary format appropriate for the secure and timely delivery of public safety data to airport systems, airlines, and related parties, and as such, needs to be mapped, extracted, re-coded, and validated before the data is transmitted as MECV public safety data to the Data Repository 141.

The passenger screening feed data 106 received from the airport passenger screening system includes wait time information 126 from the airport passenger screening system or a proxy. This passenger screening data includes external passenger screening data such as TSA no-fly list data, federal or State judicial information for wanted persons or fugitives, federal or State law-enforcement data relating to child-safety alerts, immigration, customs, taxation, and so forth. In other embodiments law enforcement information relating to TSA lists, other federal agency information such as DEA (drugs), FDA (foodstuffs, pharmaceuticals, etc.), Treasury (currency), ATF (firearms, etc.), and similar parallel State government or law enforcement data may also be included. This external passenger screening feed data is structured and transmitted in a secured and/or proprietary format appropriate for the secure and timely delivery of passenger screening data to airport systems, airlines, and related parties, and as such, needs to be mapped, extracted, re-coded, and validated before the data is transmitted as MECV passenger screening data to the Data Repository 141.

The weather feed data 107 received from the airport weather system includes current destination weather information 127 from the airport weather system or a proxy. This external weather feed data is structured and transmitted in a secured and/or proprietary format appropriate for the secure and timely delivery of weather data to airport systems, airlines, and related parties, and as such, needs to be s mapped, extracted, re-coded, and validated before the data is transmitted as MECV weather data to the Data Repository 141.

The television feed data 108 received from the airport television control system includes broadcast channels and information 128 from the airport television control system or a proxy. This external television feed data is structured and transmitted in a secured and/or proprietary format appropriate for the secure and timely delivery of television data to airport systems, airlines, and related parties, and as such, needs to be s mapped, extracted, re-coded, and validated before the data is transmitted as MECV television data to the Data Repository 141.

The gate information feed data 109 received from the airport gate information system includes gate location information 129 from the airport gate information system or a proxy. This gate information data includes airline/airport gate assignments, gate changes, gate maintenance, jetway data, air travel delay data, passenger secondary verification and screening data, excess baggage data, carry-on baggage data, disabled passenger data (wheelchair, chaperone, carting), and special need passenger data (unaccompanied minor). This external gate information feed data is structured and transmitted in a secured and/or proprietary format appropriate for the secure and timely delivery of gate information data to airport systems, airlines, and related parties, and as such, needs to be mapped, extracted, re-coded, and validated before the data is transmitted as MECV gate data to the Data Repository 141.

The vendor feed data 110 received from the airport vendor system includes passenger services and advertising information 130 from the airport vendor system or a proxy. This external vendor feed data is structured and transmitted in a secured and/or proprietary format appropriate for the secure and timely delivery of vendor data to airport systems, airlines, and related parties, and as such, needs to be s mapped, extracted, re-coded, and validated before the data is transmitted as MECV vendor data to the Data Repository 140.

The transportation feed data 111 received from the airport transportation system includes parking, bus, taxi, and subway/rail information 131 from the airport transportation system or a proxy. This external transportation feed data is structured and transmitted in a secured and/or proprietary format appropriate for the secure and timely delivery of transportation data to airport systems, airlines, and related parties, and as such, needs to be mapped, extracted, re-coded, and validated before the data is transmitted as MECV transportation data to the Data Repository 141.

The air traffic control feed data 112 received from the airport air traffic control system includes airport status information 132 from the air traffic control system or a proxy. This air traffic control data may include airborne air traffic data, ground/runway data, ground crew and ground equipment data, jetway data, aircraft re-fueling data, aircraft re-supply data, weather data, entire air travel system data, and so forth. This external air traffic feed data is structured and transmitted in a secured and/or proprietary format appropriate for the secure and timely delivery of baggage data to airport systems, airlines, and related parties, and as such, needs to be mapped, extracted, re-coded, and validated before the data is transmitted as MECV air traffic control data to the Data Repository 141.

The conveyance monitoring feed 113 received from the airport passenger conveyance system includes elevator, escalator, jetway, and walkway information 133 from the airport conveyance system or a proxy. This external conveyance monitoring feed data is structured and transmitted in a secured and/or proprietary format appropriate for the secure and timely delivery of baggage data to airport systems, airlines, and related parties, and as such, needs to be mapped, extracted, re-coded, and validated before the data is transmitted as MECV conveyance data to the Data Repository 141.

The data repository 141 in FIG. 1 provides the downstream output 150 data that is delivered to the downstream output devices. These devices include displays 151, Smart Phones 152, Tablets and Laptops 153, and desktop computers 154. Using a handshake protocol, when a downstream output device connects to the system, the type of device is queried, and the result is saved at the data repository level 140/141 to a user's profile. The device type is assigned to the user profile during that access session and the MECV data drawn from the data repository 141 is filtered to provide the user with the data appropriate to their use/request. Repository Data Filters include filtering according to a user access privilege/security level filter, a user type-of-data request filter, data timeliness/priority filter, and so forth.

Where a device is, for example, an airport video display device 151, the control center/node can assign a specific real-time selection data to the pushed out to the display. Beyond displaying departure times or baggage pickup areas, remote displays connected to a data repository become Smart Remote Displays (SRDs) that are automatically updated according to the passengers/users that are located near the display. By using a unified database system with mapped, extracted, coded, and validated data, an SRD will be modified depending on which passengers are arriving near that display device, and which ones are departing near that display device. This level of customization and geolocation of users provides real-time updating of gate information, real-time baggage advice, real-time vendor and concession marketing and advertising, real-time safety or detour information, real-time weather advice, real-time transportation coordination, and real-time airport conveyance allocation.

Figure 2:
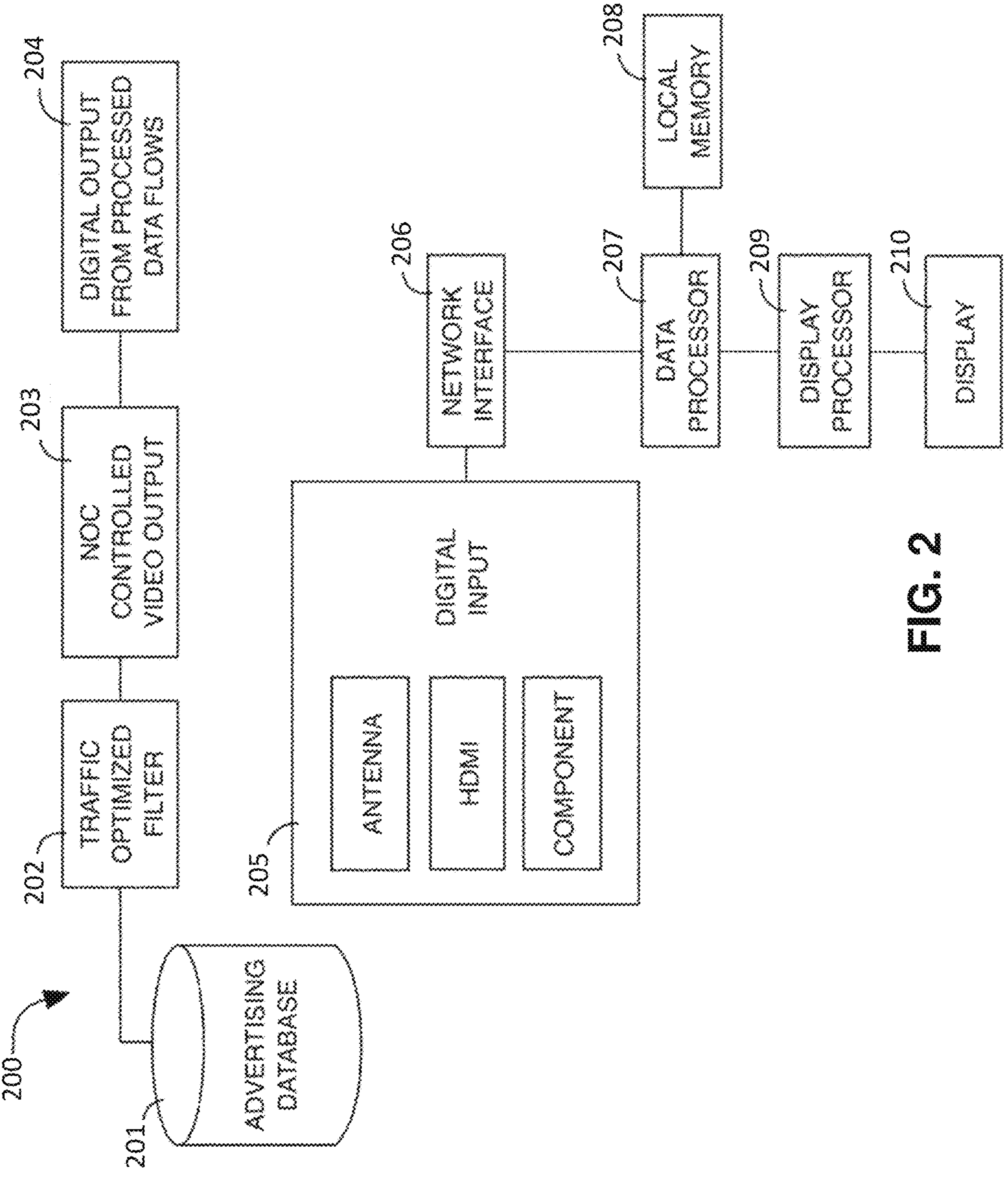
FIG. 2 is a subsystem diagram according to at least one embodiment.

FIG. 2 is a subsystem diagram 200 illustrating how advertising activity using a VPN-integrated or web-integrated advertising database can receive system user traffic information from a central node or NOC, which can then insert video-, audio-, or text-based advertisements into endpoint user-facing display devices through appropriate network interfaces, and which uses the digital input from the processed data streams to update and/or tailor user-facing advertising or public service announcements.

Advertising database 201 is connected to a traffic optimized filter 202. Passenger traffic is generated by the physical movement of passengers through the facility. Passenger data traffic is generated as users interact with the system. NOC controlled video output 203 represents digital output from the processed data feeds 204 and is sent to digital output 205. Digital output device may include the necessary hardware for receiving, processing, and displaying the system output, such as for example, antenna(e), HDMI connections, component connections, etc. and hardware interface 206, data processor 207, local memory 208, display processor 209, and display screen(s) 210.

These descriptions, of which the drawings are a part, also detail embodiments directed to a smart display system components architecture. In at least a first embodiment embodiments, the invention comprises a smart display system having computer program instructions saved to memory and executable on a processor configured to implement modules, servers, databases, components, and services, in which a multi-user flight information display (MUFID) Services module is: operatively associated with a smart display services module; operatively associated with a Smart Data Entry module; and operatively associated with a smart display frontend module.

An official airline guide (OAG) is the source for providing realtime, timely and actionable flight information. An Information Integrator component contains the smart display MUFID services that are responsible for fetching the real-time flight data from the OAG and storing into a My SQL database, an Open Integrator Hub component consists of smart display services which contains all the business logic that is necessary to manage the flight content and reads latest flight information from the My SQL database and provides realtime changes to Smart Display Admin App called Smart Data Entry and Smart Display App. The smart display system presents different views such as FIDS, BIDS, GIDS on multiple screens.

Smart display services may be integrated with an external content management system. In some embodiments, the core components of the smart display are deployed on an AWS environment.

In at least a second embodiment, the invention provides a smart display system. An OAG cloud connected to an AWS cloud, the AWS cloud connected to a Digital Display System module, the OAG cloud including the OAG flight schedule. The OAG cloud is connected to an information integrator module within the AWS cloud and has Basic Auth services. The AWS cloud also includes a MySQL OAG logical store connected to the information integrator module. An Open Integration Hub having a RESTFUL API is within the AWS cloud and is operatively connected to the MySQL for data crud and to at least one external cloud service such as Aquia. An Azure Groups module is within the AWS cloud and is operatively connected through a crud interface to the Open Integration Hub. The Azure Groups module is also operatively connected to an external Azure cloud having auth and role services. A Smart Display App module is within the AWS cloud and is operatively connected to the Open Integration Hub for transmitting flight data and to the Digital Display Systems module for transmitting display end points, embodied as display screens 210 (FIG. 2) in at least one example. A Smart Display Admin App is within the AWS cloud for managing communications with the Azure Groups.

Any of the embodiments herein may include Further comprising a Smart Display System Architecture that includes a System Architecture on AWS, and an AWS infrastructure comprises a primary site and at least one disaster recovery (DR) site.

Any of the embodiments herein may include that the following components are installed on a Primary Site Route 53 component providing scalable DNS service used to route incoming traffic to the appropriate services running in EKS, the Route 53 component providing DNS resolution for Kubernetes services running in an EKS cluster, wherein end devices send the request to a request recipient component. An Amazon Elastic Kubernetes Service (EKS) cluster component, wherein the EKS is a fully managed Kubernetes service that makes it easy to deploy, manage, and scale containerized applications. The EKS cluster component hosts the Kubernetes resources such as pods, services, and deployments that are used to run the application, and the EKS worker nodes are distributed across 3 AZs for high availability and fault tolerance. The Smartdisplay app services are deployed to the EKS cluster component. An Amazon Virtual Private Cloud (VPC) component is a logically isolated network within the AWS cloud that enables the user to launch AWS resources into a virtual network. The VPC component provides a secure and private environment to run the EKS cluster component and RDS instance. A Multi-AZ Aurora MySQL RDS component provides a highly available database service that automatically replicates data across multiple Availability Zones (AZs) in a region, the multi-AZ Aurora MySQL RDS. If one instance fails, traffic is automatically redirected to the standby instance without any noticeable impact to the application's availability. A Load Balancer component includes the recipient component, and the Amazon Elastic Load Balancer (ELB) automatically distributes incoming traffic across multiple targets to improve the availability and scalability. The ELB is used to distribute incoming traffic to the EKS cluster component instances running smart display app services.

The end devices in some embodiments are Chromeboxes, and in some embodiments are BrightSign players.

In any of the embodiments herein, duplicate components can be installed on at least one DR site and an EKS cluster node group has only single node, which can be scaled up on demand, wherein an aurora RDS on the at least one DR site is a single AZ read replica from an aurora on an RDS Primary.

Any of the embodiments herein may include that the Route 53 component is configured with program instructions executable on a processor to provide automatic failover in case of a service outage or failure, the EKS cluster component is configured with program instructions executable on a processor to run containers in a scalable and fault-tolerant way, the VPC component is configured with program instructions executable on a processor to provide a secure and private environment to run the EKS cluster component and RDS instance, and the RDS component is configured with program instructions executable on a processor to provide automatic scale storage and compute resources as the application workload grows.

Figure 4:
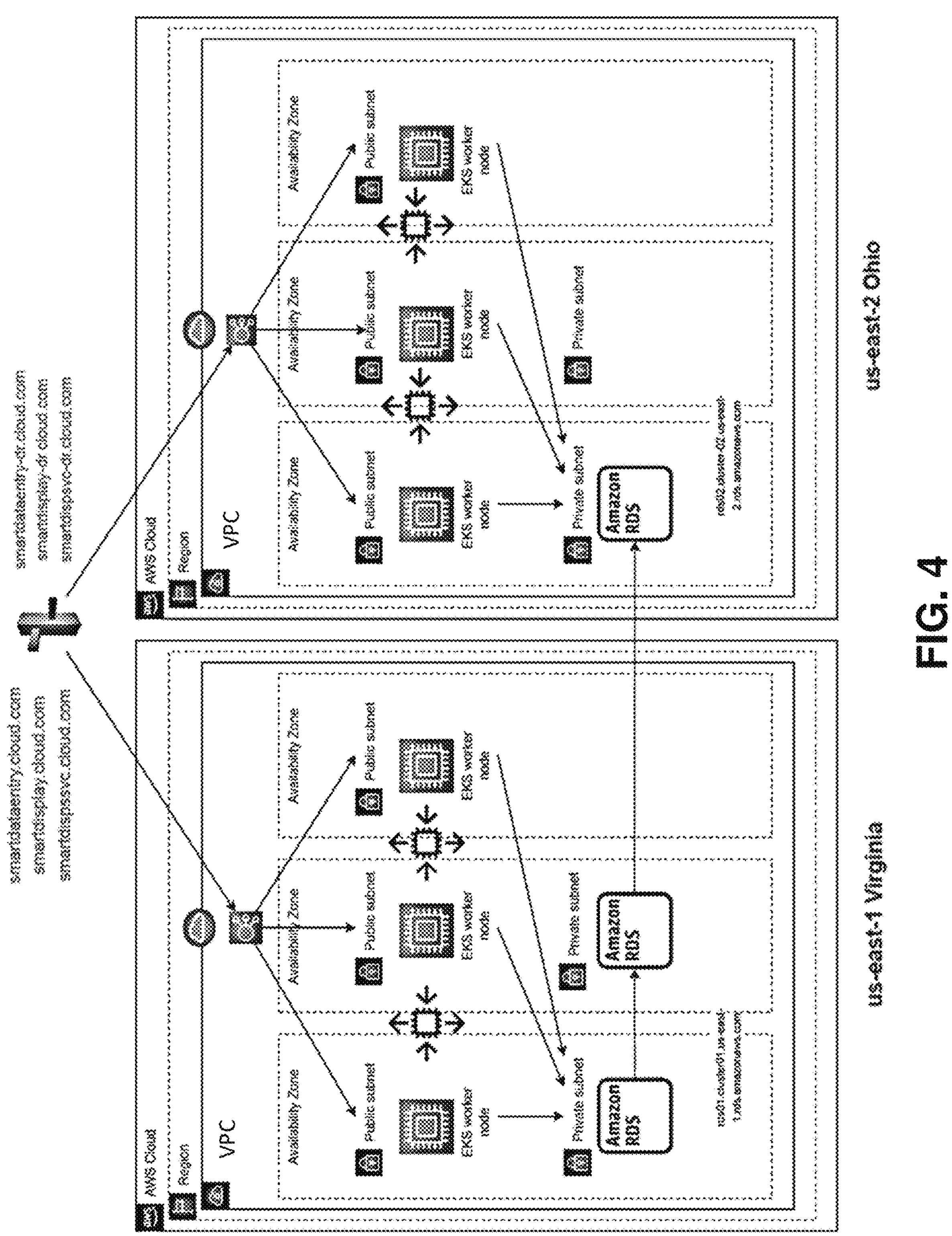
FIG. 4 is a system diagram, according to some embodiments, in which cloud systems contain at least one region, and each region includes at least one VPC, each VPC containing multiple availability zones.
Figure 5:
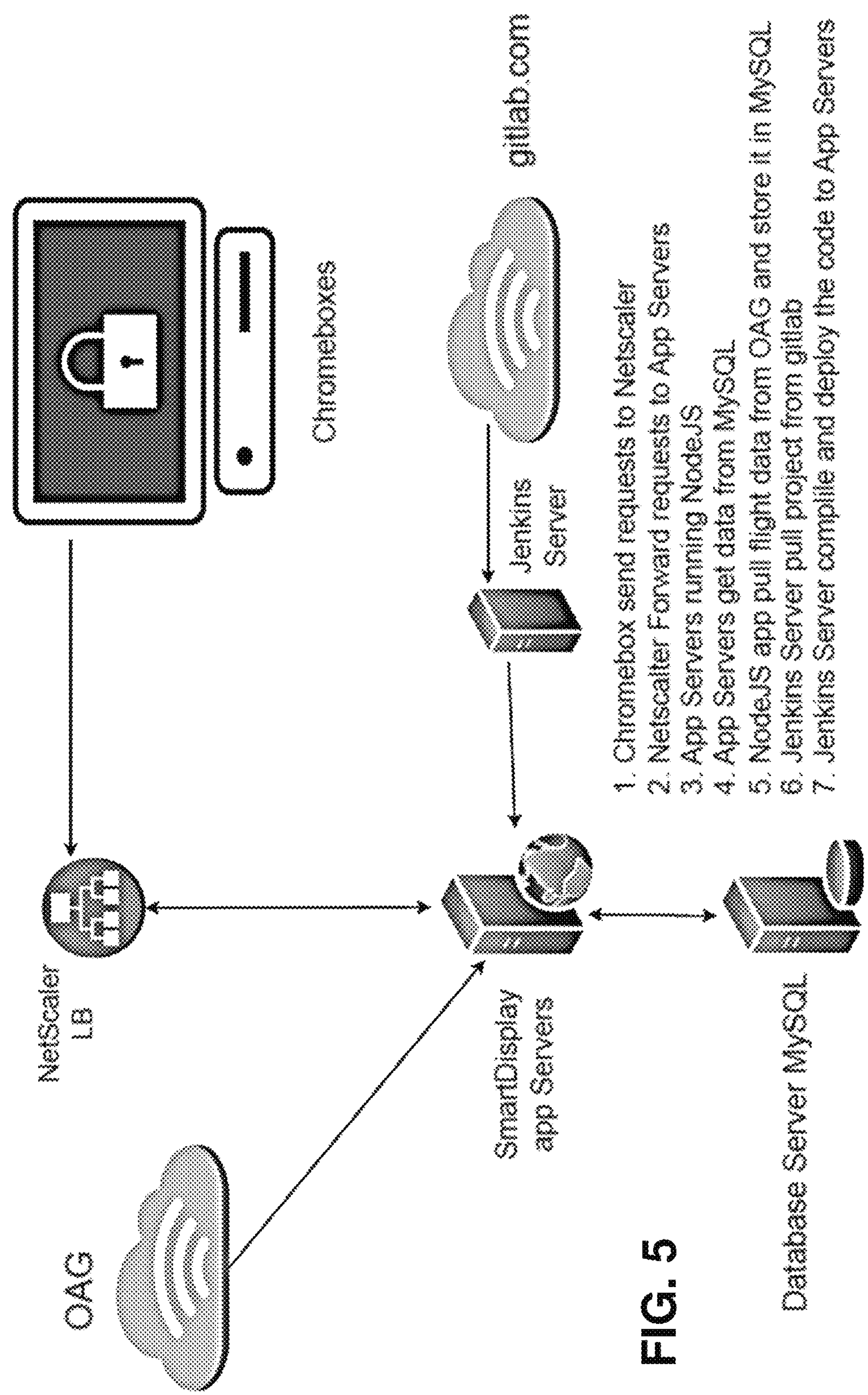
FIG. 5 shows an on-premises system architecture according to at least one embodiment.

Any of the embodiments herein may include, as shown in FIG. 4, that each instance of the AWS cloud contains at least one region, and each region includes at least one VPC component, each VPC component containing multiple availability zones, each availability zone having a public subnet with an EKS worker node, and a private subnet with an Amazon RDS. The smart display system can be operatively connected to feed data to the public subnets, each EKS worker node feeding data to at least one private subnet, the private subnets each in operative communication with the other private subnets across regions and across clouds.

Any of the embodiments herein may include wherein the smart display system comprises an On Premise System Architecture comprising a MySQL database, a Netscaler Load Balancer, and application server, a Jenkins Server and media Servers, wherein: a NodeJS application running on the application server constantly pulls flight data from the OAG and a population within MySQL; the Jenkins server polls a gitlab server for change and deploy the smartdisplay apps into application servers; a Netscaler is used to distribute requests from end devices to smartdisplay apps running on applications Servers, and Media files are serving from Media Servers.

In some embodiments, systems described and illustrated herein provide AWS infrastructure and on-premises architecture and components of Smart Display system.

In some embodiments, systems described and illustrated herein provides a Smart Display system components architecture (FIG. 3), system architecture including the disaster recovery (DR) on AWS, and high availability architecture of on-premises environment for Smart Display system.

The core components in some embodiments of a Smart Display system are MUFID Services, Smart Display Services, Smart Data Entry, and Smart Display frontend. OAG is the source for providing realtime, timely and actionable flight information. The Information Integrator component contains the Smart Display and MUFID Services are responsible for fetching the realtime flight data from the OAG and storing into My SQL database. The Open Integrator Hub component in some embodiments consists of Smart Display services containing all the business logic that is necessary to manage the flight content. It reads latest and greatest flight information from My SQL database and provides realtime changes to Smart Display Admin App called Smart Data Entry and Smart Display App. Smart Data Entry application is a web application provides different user interfaces and features based on the user authentication and authorization.

The smart data entry application in some embodiments provides two different types of user authentication: one in which the smart data entry application can integrate with Azure; and another based on a database login.

The second embodiment described in the preceding may include a Smart Data Entry application comprising a web application providing different user interfaces and features based on the user authentication and authorization.

The smart data entry application in some embodiments provides two different types of user authentication: one in which the smart data entry application integrates with Azure; and another based on a database login.

The smart display system in some embodiments presents different views such as FIDS, BIDS, GIDS on to the screens. Smart Display services can also be easily integrated with any external systems such as Aquia. All the core components of Smart Display are deployed in an AWS environment.

The Smart Display System Architecture in at least one embodiment includes a System Architecture on AWS. The AWS infrastructure consists of Primary Site and DR sites. The following components are installed on a Primary Site:

Route 53 component: Route 53 is Amazon's highly available and scalable DNS service. It is used to route incoming traffic to the appropriate services running in EKS. Route 53 provides DNS resolution for the Kubernetes services running in the EKS cluster. End devices (Chromeboxes and/or BrightSign players as non-limiting examples) send the request to Load Balancer and Load Balancer sends them to targets.

Amazon Elastic Kubernetes Service (EKS) Cluster: EKS is a fully managed Kubernetes service that makes it easy to deploy, manage, and scale containerized applications. The EKS cluster hosts the Kubernetes resources such as pods, services, and deployments that are used to run the application. EKS worker nodes are distributed across 3 AZs for high availability and fault tolerance. Smartdisplay app services are deployed to EKS cluster.

Amazon Virtual Private Cloud (VPC): VPC is a logically isolated network within the AWS cloud that enables the user to launch AWS resources into a virtual network. VPC provides a secure and private environment to run the EKS cluster and RDS instance.

Multi-AZ Aurora MySQL RDS provides a highly available database service that automatically replicates data across multiple Availability Zones (AZs) in a region. With a simple RDS, if the database instance fails, it may take some time to bring up a new instance, and this downtime could impact the availability of the application. In contrast, with multi-AZ Aurora MySQL RDS, if one instance fails, traffic is automatically redirected to a standby instance without any noticeable impact to the application's availability.

An Amazon Elastic Load Balancer (ELB) automatically distributes incoming traffic across multiple targets to improve the availability and scalability, wherein the ELB is used to distribute incoming traffic to the EKS cluster instances running smart display app services.

The same components are installed On DR site but EKS cluster node group has only single node, which can be easily scaled up on demand. The aurora RDS on DR site is single AZ read replica from the aurora on RDS Primary.

The architecture is designed with high availability and scalability in mind with a cater for region failure scenario module. The Route 53 service provides automatic failover in case of a service outage or failure. The EKS cluster is designed to run containers in a scalable and fault-tolerant way. The VPC provides a secure and private environment to run the EKS cluster and RDS instance, and RDS is designed to automatically scale storage and compute resources as the application workload grows.

Figure 3:
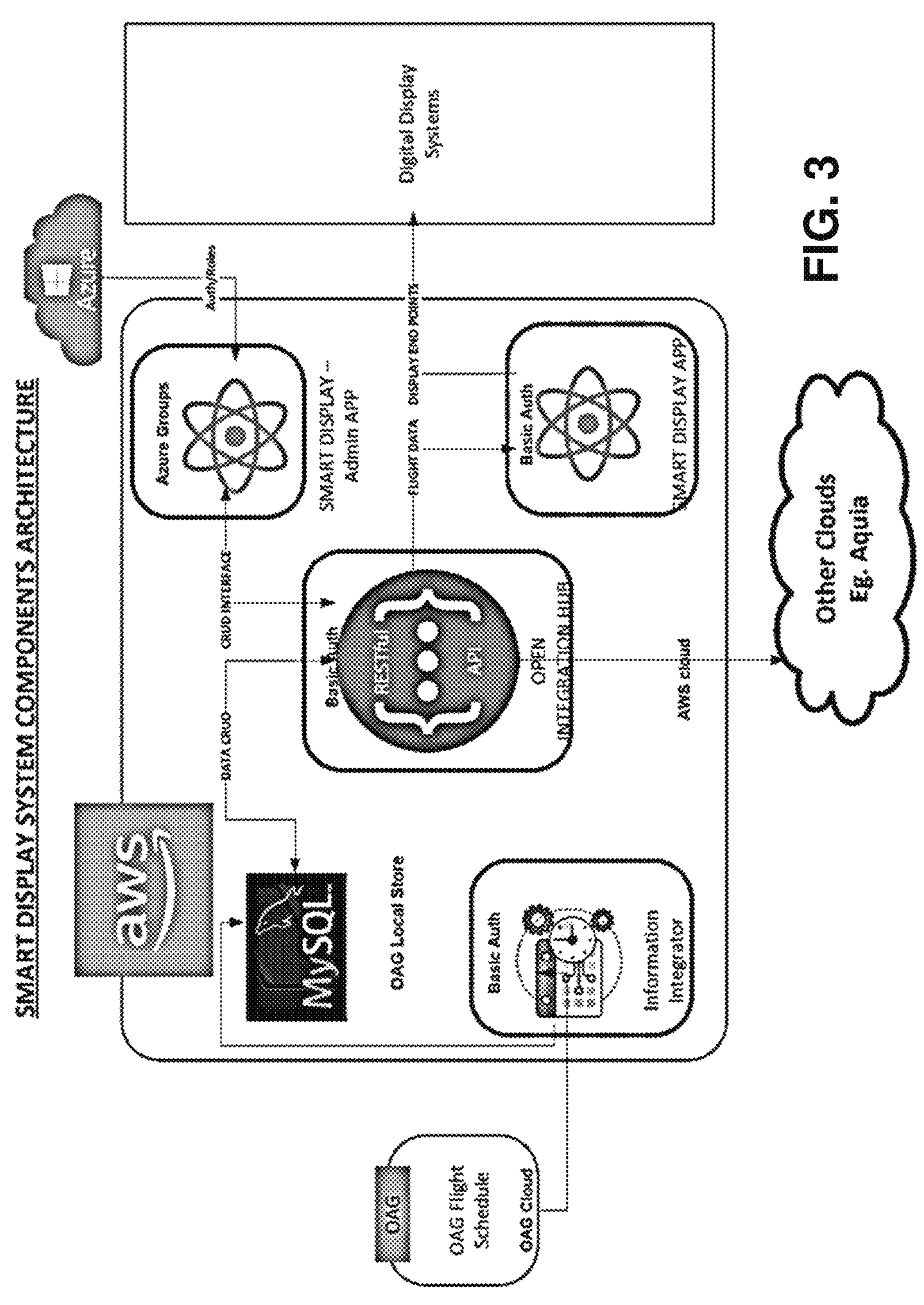
FIG. 3 is a system diagram showing the architecture of Smart Display system components according to at least one embodiment.

The invention provides an On Premise System Architecture (FIG. 3). The On Premise infrastructure in the illustrated embodiment consists of MySQL database, Netscaler Load Balancer, Application Server, Jenkins Server and media Servers. NodeJS application running on Application Server constantly pulls the flight data from OAG and population MySQL. Jenkins server poll gitlab server for change and deploy the smartdisplay apps into Application Servers. Netscaler is used to distribute requests from end devices to smartdisplay apps running on Application Servers. Media files are served from Media Servers.

As defined herein data federation refers to a novel software and hardware enabled process that allows multiple databases to function as one. This virtual database takes data from a range of sources and converts them all to a common model. This provides a single source of data for front-end applications. A data federation is part of the data virtualization framework.

In a first particular example detailed in the following, an airport system includes a 2-airport system in a large metropolitan area. Between the two campuses, the airport systems operate approximately 1,500 digital display screens which span many sign types: flight information, baggage, gate, ticket counter, directory, wayfinding, billboards and others. For an airport, digital signage is a valuable public-facing assets, informing, guiding, directing, and assuring passengers along every airport touchpoint, from the moment they arrive at facilities up until when they're waiting for boarding at their gate.

In this example, there is provided a Smart Display system that Smart Display addresses all of the listed challenges by consolidating and centralizing an airport's digital display systems into a single, secure, Cloud-based platform. For passengers, it ensures accurate travel information across their airport journey and ease of wayfinding. For airlines, it enables a mobile workforce and simple, intuitive management and customization of content. And for the airport, it empowers administrators to retain control of digital signs and gain many new capabilities in airport ops, revenue, branding and safety. Perhaps most importantly, it enables the airport system to stay agile and adaptable to the rapidly shifting needs of the travel landscape. This is accomplished by ensuring consistent, accurate data not only across airport digital signage, but also ensuring that same accuracy and consistency across web and mobile app channels as well.

In this example, the data feeding the airport signage systems came from airlines, 3$^{rd}$ party vendors, brokers, and other agencies, and the data had been managed separately in silos, with each system updating information from different sources, through different means and at different rates. The prior system introduced numerous opportunities for data discrepancies, with no system of record serving as a single version of truth. These issues and discrepancies also carried across to the prior website and mobile app for passengers.

In the present invention, the SmartDisplay centralizes and standardizes information used by MUFIDS and other display systems into an integration engine by collecting data from multiple sources into a single database. The integration engine also helps to identify and minimize data discrepancies by implementing a validation check as well as cleaning up the data in a way that makes sense to passengers. For instance, data received from a standard data source will often contain incomplete airport names, such as for instances where a city has two airports. The inventive engine has data cleanup rules to manipulate the data so that it can be understood by travelers.

The invention also provides a build of new business rules so that our airlines' updates always take precedence over the other data sources. This feature ensures that even if connectivity is available, airline agents still have access to their data and the ability to modify it.

The invention also provides a solution to ensure data consistency across the signage, web and mobile medium by leveraging the platform-based approach for Smart Display, and building it upon underlying integration layer that enables other systems to easily plug into via open APIs. The invention provides that the website and mobile app for customers will always reflect the same data that travelers will see in the terminals.

In this example, while the digital displays are flashy and provide for great user experience, the real challenge and achievement lies underneath the exterior: the magic happens in the data fusion services that consolidate feeds from numerous sources, deconflict and prioritize based on business rules derived from internal and external stakeholders, and synthesize the results into multiple data products.

In this example, a smart display system takes an integrated platform-based approach to centralizing our airport digital display systems and breaks the boundaries of current airport technology solutioning standards.

A smart display system according to these descriptions can put Control of Digital Signage Assets Back in the Hands of the Airport. Smart Display empowers the airport to retain control of its digital signs and gain many new capabilities in ops, revenue, branding and safety. The invention provides an open-ended framework that enables integration with external systems.

In this example, Smart Display is integrated with the public announcement system and emergency response system and uses natural language transcription to convert audio announcements to text on the signs for ADA compliance.

In this example, airports can maintain control of their most important assets while staying lean, simple, and secure. The solution leverages a shared technology framework, reusing common infrastructure and Cloud to quickly deliver advanced technology capabilities across our airports in an extremely cost effective, flexible and scalable manner. This approach translates to seamless interoperability and data sharing and allows airports and other facility operators to address future business needs as quickly as they arise.

The system also applied a decoupled architecture in which the system backend operates independently of the front-end displays. This technology-agnostic environment provides flexibility of digital display upgrades without requiring a complete system overhaul or dependence on any contractors or 3rd parties.

The invention also provides the re-Use of Existing IT Infrastructure and Commercial Hardware to ensure stellar performance, high availability, ease of implementation, and low cost. In the prior environment, each system operated off its own hard-wired network, creating single points of failure. The new invention system can operate on Wi-Fi connectivity where possible, so that additional network connectivity serves as a backup connection. This effectively ensures high availability, which is critical for a system delivering travel information to passengers.

Additionally, the inventive system leverages commercially available Chromeboxes and/or BrightSign players to serve as a media player, which simplifies procurement, development, and implementation. Furthermore, from a security perspective, Chromeboxes are about as secure as Apple OS, and provide an advantage over the old Windows-based systems, which require virus control and multiple other layers, all of which require additional costs and maintenance per endpoint. The inventive system also provides a Machine Learning & Predictive Analytics component to Optimize Airport Operations and Passenger Experience.

In this example, the Smart Display currently pilots features that leverage AI/ML tools and predictive analytics to use flight and other data to understand flight delays, how gates are utilized, and other aspects of airport operations and facilities management to glean better insights from data. Based on intelligence gathered, Smart Display enables the airports to re-allocate and optimize gate slots which potentially helps MWAA save or recover millions of dollars in revenue by identifying opportunities. It also helps the airlines to operate more efficiently by providing a better travel experience for passengers.

For example, the system can be trained over time to produce accurate forecasts on on-time arrivals and departures and uses data from camera analytics to produce heat maps to anticipate passenger dwell and flow, by gate and terminal.

An advertising management module to help capture new revenue streams. In this option, when signs are not being used, Smart Display is able to dynamically leverage them for advertising and video. An airports 1,500 digital signs offer high value advertising potential because: 1) they serve passengers along key touchpoints in their journey where each sign type is directly sought out, used, and interacted with by passengers for the information they provide, and consequently, 2) there is significant dwell time, and thus greater reach and impressions.

In this example, the advertising features provide for digital advertising concessions to add signage into existing digital advertising contracts with the airports. Based on a 40 M annual passenger count and a rate of $5-10 per 1,000 impressions, Smart Display is estimated to generate an additional $1.8 to 3.6M annual gross revenue potential.

In another optional feature, the inventive system provides centralized emergency broadcasting capability. In the prior environment, broadcast alerting capabilities through airport digital signage was restrictive at best, with no means to disseminate messaging across all airport screens. In cases where the software did offer limited capabilities, the software required that an image be uploaded to a USB thumb drive and then loaded onto each system, rendering it unfeasible. In the present inventive system, the Smart Display provides for emergency response coordination, by delivering near-instantaneous broadcast messaging across all screens, or screens within a certain terminal or location, and/or sign type. Different alert types can be customized to display a certain way. The inventive system provides emergency messaging capability, for example via the Smart Display Admin App in some embodiments, to authorized users. The emergency messaging permits authorized users to control, update, or add to the content transmitted to the display screens. The emergency messaging capability may include a one-click solution, for example by click or selection of a generated or predefined alert or a representative token or button. The content of emergency messages transmitted to the display screens may be in part corresponding incoming emergency content in the various data feeds provided to the system, and/or may include with the incoming emergency content additional information authored or selected by authorized users.

It may be understood the communication with data feeds may be two ways. In some embodiments the smart display system may send return data to the data provider. For example, in an embodiment where an airport has more up to date information than the data provider with respect to flight delays, that information may be fed back to the data provider who then may use that data to update their own feeds.

In at least one embodiment, an emergency management system is implemented by creating emergency management templates, which can be one click solutions to dispense emergency notifications across all participating facilities. Drag and drop messages are enabled with one click to one or more zones (e.g. concourse A, concourse B, Security). In some embodiments the messages may be pre-created templated messages for responding to a variety of circumstances, for example fire, recent crime or assault, flooding, etc. It may be understood that templates may likewise be used in any number of other applications.

In some embodiments, multiple advertising companies and other types of companies can provide content, which is hosted by the service provider or entity implementing, managing, and/or facilitating the display system, and the content can be displayed based on the advertising requirements. Business rules can be improved, e.g. advertisements based on or directed to passengers on an incoming international flight can be delayed to give time for flight passengers to get through customs etc. In some embodiments advanced features such as, but not limited to, slot based ad injections, content looping, and ad stacking may be supported.

Different rules can be tailored to circumstances and types or access and/or use, to serve, regulate, and/or limit access according to different levels of users, such as administrators versus airline customers. The centralized system makes content dissemination and access easier for users/admins/etc, who don't have to juggle multiple logins etc. Likewise, the kind of information displayed to the different levels of users may be customized based on the user level, for example police or other investigative forces may receive a series of public safety or crime related notifications as a default.

In some embodiments, the system is, provides, or includes an open-ended port that allows integration with a plurality of external systems, e.g. wait time information or weather information, and such.

The smart display system can additionally act as a content management and dissemination system beyond airport scenarios. In some embodiments, all described features and functions and/or those analogous are provided by the smart display system in convention centers, sport stadiums, universities, theme parks, and other public and private spaces wherever people accumulate, travel, reside, enjoy recreation, and or work. Wherever airport use and such content display as flight information is described herein, it is to be understood that broader utility and implementation is within the scope of these descriptions.

Integration with emergency notification and public announcement systems further unifies the emergency response coordination.

In some embodiments, an artificial intelligence algorithm implemented by the one or more processors accesses periodically or persistently updated data set, automatically determines from the data set events for display on the multiple display screens, and at least one of triggers or proposes messaging about the events be displayed on the multiple display screens. The data set includes, for example, all or portions of the flight data, the content displayed by the multiple display screens. All data flows available to and generated by the system are available for ingestion by the artificial intelligence algorithm. The artificial intelligence algorithm conducts at least periodic machine learning based at least in part on the data set.

As described herein, a smart display application serves as a unified central interface for efficiently managing multitude of digital display systems within airport premises. These displays cater to diverse functions, purposes, and target audiences. The Smart Display empowers various airport stakeholders, granting them the ability to seamlessly oversee, tailor, and refresh their digital content across a spectrum of display systems, all via a singular integrated platform. As a result, accessing data and content becomes more streamlined, fostering heightened productivity and operational efficiencies across every facet of airport operations.

Additionally, the application consolidates multiple disparate applications under a single content management system, allowing for the configuration and management of displays throughout the airport premises. Multiple graphical user interface (GUI) tools are provided, of which non-limiting and non-exhaustive examples are provided in the following.

For example, a respective GUI, tool, window, and/or a subsystem relates to Domestic Departure, used to manage and disseminate information for domestic departures, such as departure time, flight status and gate selection.

A respective GUI, tool, window, and/or a subsystem relates to Domestic Arrival, used to manage and disseminate information for domestic arrivals, such as arrival time, flight status, gate selection, and baggage claim data.

A respective GUI, tool, window, and/or a subsystem relates to International Departure used to manage and disseminate information for flight information for international departures, such as departure time, flight status, and gate selection.

A respective GUI, tool, window, and/or a subsystem relates to International Arrival, used to manage flight information for international arrivals such as arrival time, flight status, gate selection, and baggage claim.

A respective GUI, tool, window, and/or a subsystem relates to Baggage, used to configure when baggage claim information is displayed on BIDS screens for passengers. Otherwise, baggage information may be displayed based on default system parameters.

A respective GUI, tool, window, and/or a subsystem relates to Gates, used to manage how and when flight information is displayed on GIDS screens. Otherwise, information may be displayed based on default system parameters.

A respective GUI, tool, window, and/or a subsystem relates to Broadcast Content, by which the system is configured for at least two types of broadcast content: alerts, and marketing. As to alerts, the system adapts to two alert types, informational and emergency. Depending on the severity, the system is configurable to adapt to the alert type. Marketing/Revenue provides support for revenue generation, improved passenger experience, and brand identity by way of digital advertising and video content.

A respective GUI, tool, window, and/or a subsystem relates to Airport Directories, used to provide the ability to create and update the airport directory map displayed for passenger wayfinding in the terminals.

A respective GUI, tool, window, and/or a subsystem relates to Customs, granting ability to flag international arrivals as having entered the customs process. This status can then be displayed on the monitors near the Arrivals area.

A respective GUI, tool, window, and/or a subsystem relates to User Account Management, by which system administrators can securely define, edit and manage user roles and assign users to those roles.

Additional capabilities are also available in various embodiments, such as configuring status codes and manage device groups.

Figure 6:
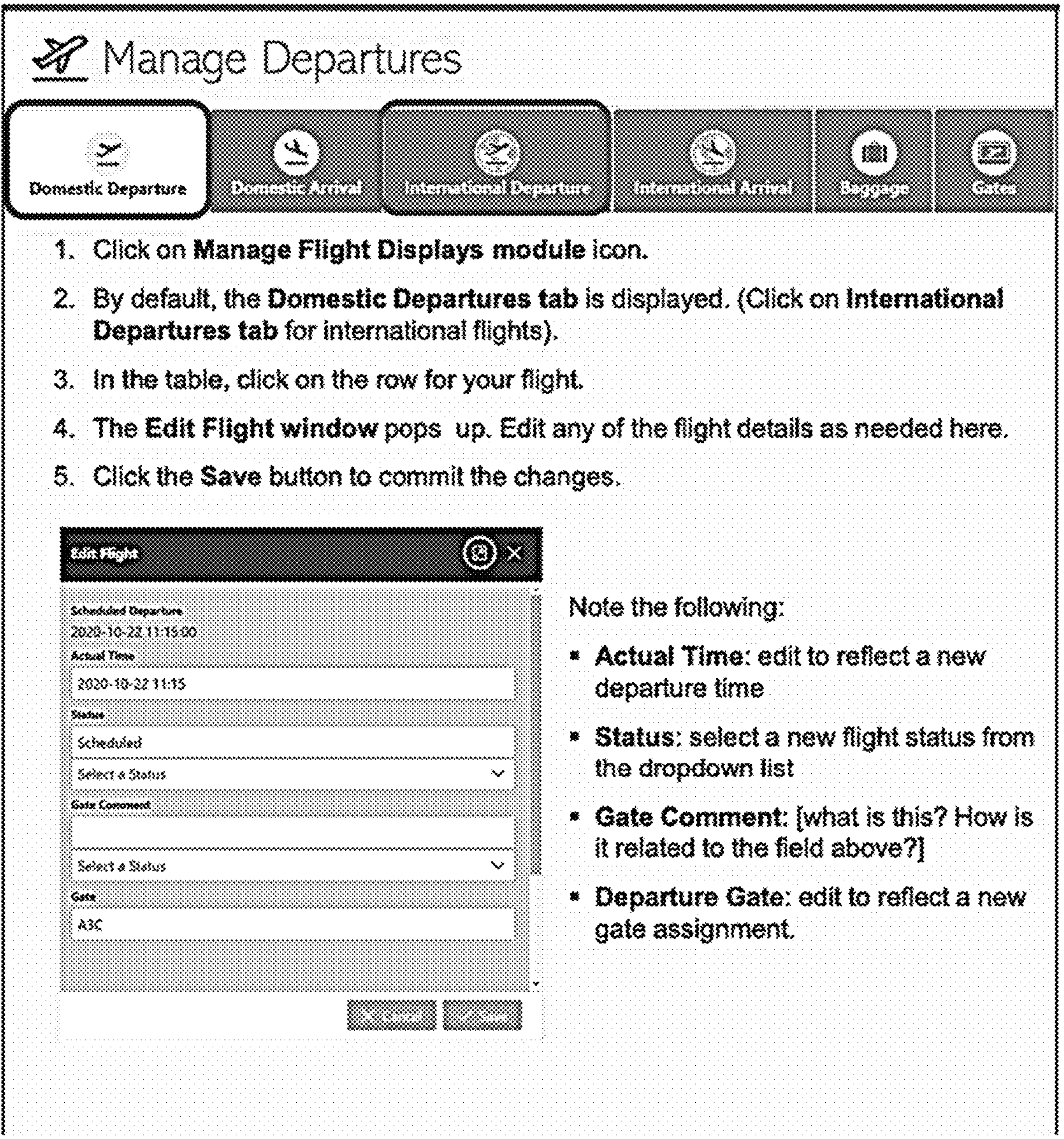
FIG. 6 is a screenshot of a Manage Flight Displays graphical user interface (GUI) according to at least one embodiment.
Figure 9:
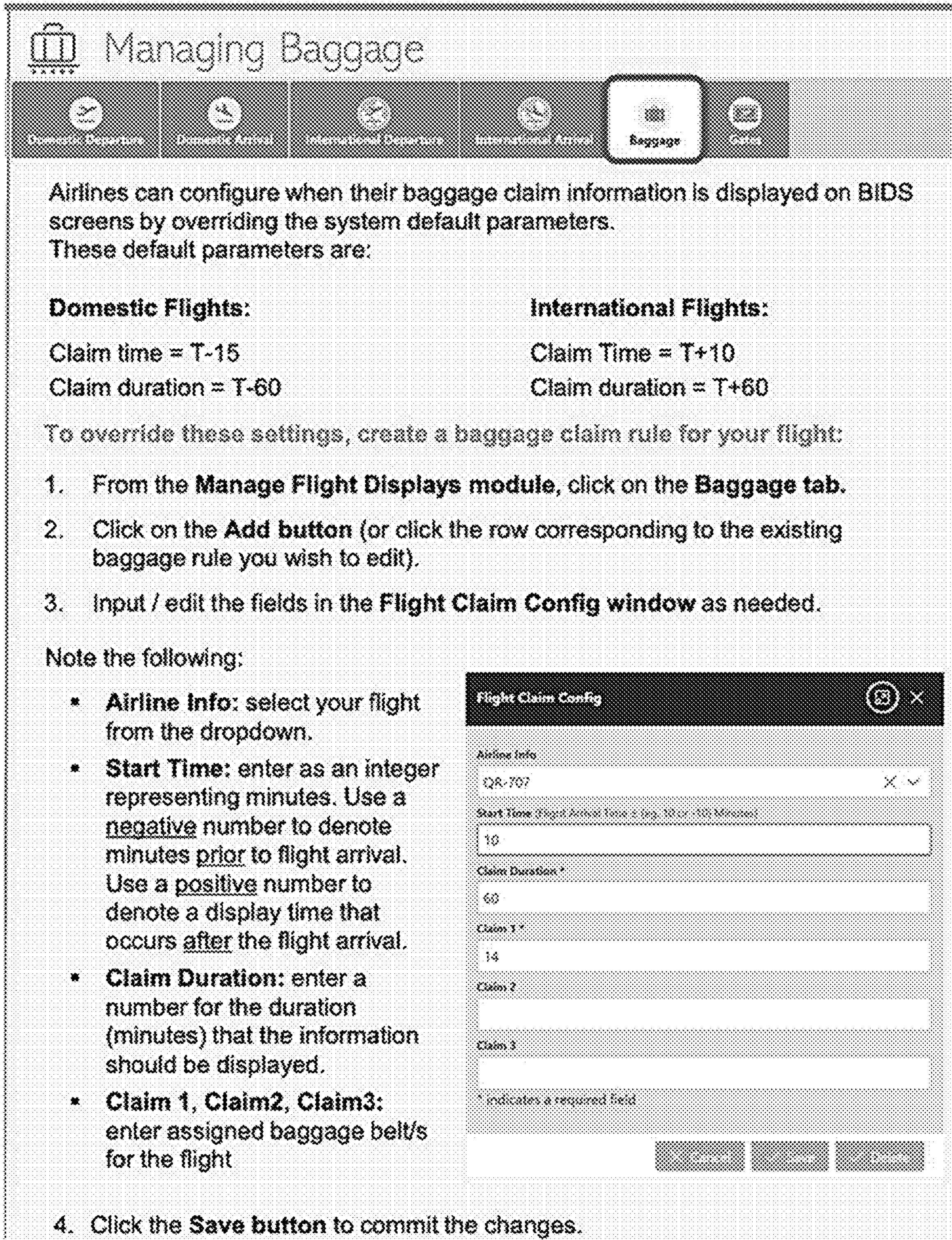
FIG. 9 is a screenshot of a Manage Baggage GUI according to at least one embodiment.

In a second particular example of an airline smart display system, detailed in the following, the invention provides a system and an interface for airline subscribers to access and manage airport data. A modular set of graphical user interface (GUI) screenshots, according to at least one embodiment of each, is provided in FIGS. 6-9. A Manage Flight Displays module (FIG. 6) provides access and control for domestic departures, international departures, Flight window, Actual time, Status, gate comment, and Departure Gate. A Manage Arrivals module (FIG. 7) provides access and control for domestic arrivals, international arrivals, Flight window, Actual arrival time, Arrival Status, Arrival gate comment, and Arrival Gate, and Baggage Claim data. A Manage Gate Displays module (FIG. 8) provides access and control for Display Start Time, Display End Time, Manage Flight Displays, Gates, Flight gate config window, and code sharing. A Manage Baggage module (FIG. 9) provides access and control for Domestic flight claim time and claim duration, international flight claim time and claim duration, a Manage Flight Displays window, a Baggage tab, airline info, start time, claim duration, and Claim baggage belt assigned for the flight.

Particular embodiments and features have been described with reference to the drawings. It is to be understood that these descriptions are not limited to any single embodiment or any particular set of features, and that similar embodiments and features may arise, or modifications and additions may be made without departing from the scope of these descriptions and the spirit of the appended claims.

What is claimed is:

1. A smart display system for displaying content on multiple display screens, the smart display system comprising:

multiple display screens;

one or more processor operatively connected to the multiple display screens;

and at least one of a memory device and a non-transitory storage device storing computer program instructions executable on the one or more processor, wherein execution of the computer program instructions by the one or more processor configures the one or more processor to implement modules, servers, databases, components, and services, in which:

a multi-user flight information display (MUFID) Services module is operatively associated with a smart display services module, operatively associated with a Smart Data Entry module, and operatively associated with a smart display frontend module;

an official airline guide (OAG) provides timely and actionable realtime flight data;

an Information Integrator component provides smart display MUFID services for fetching the flight data from the OAG and storing the flight data into a My SQL database;

an Open Integrator Hub component providing smart display services, which contain business logic to manage flight content and reads latest flight data from the My SQL database and provides realtime changes to a Smart Display Admin App called Smart Data Entry and Smart Display App; and one or more processor controls the multiple display screens to display content comprising at least a portion of the flight data, wherein a smart data entry application permits at least two different types of user authentication comprising: one in which the smart data entry application can integrate with Azure; and another based on a database login.

2. The smart display system according to claim 1, further comprising a Smart Display System Architecture that includes a System Architecture on AWS, and an AWS infrastructure comprises a primary site and at least one disaster recovery (DR) site.

3. The smart display system according to claim 1, further comprising, installed on a primary site:

an Amazon Elastic Kubernetes Service (EKS) cluster component;

a Route 53 component providing scalable DNS service used to route incoming traffic to services running in the EKS cluster component, the Route 53 component providing DNS resolution for Kubernetes services running in the EKS cluster component, wherein end devices send a request to a request recipient component;

wherein the EKS cluster component provides a managed Kubernetes service facilitating to deployment, management, and scaling of containerized applications, wherein the EKS cluster component hosts Kubernetes resources including at least one of pods, services, and deployments, wherein EKS worker nodes are distributed across multiple AZs for high availability and fault tolerance, and services of the Smart Display App are deployed to the EKS cluster component;

an Amazon Virtual Private Cloud (VPC) component, the VPC component is a logically isolated network within an AWS cloud that enables a user to launch AWS resources into a virtual network, wherein the VPC component provides a secure and private environment to run the EKS cluster component and RDS instance;

a Multi-AZ Aurora MySQL RDS component provides a highly available database service that automatically replicates data across multiple Availability Zones (AZs) in a region, wherein if one instance fails, traffic is automatically redirected to a standby instance without any noticeable impact to availability; and a Load Balancer component comprising said recipient component, the Load Balancer component comprising an Amazon Elastic Load Balancer (ELB) that automatically distributes incoming traffic across multiple targets to improve availability and scalability, the ELB used to distribute incoming traffic to EKS cluster component instances running smart display app services.

4. The smart display system according to claim 3, wherein the end devices comprise at least one of Chromeboxes and BrightSign players.

5. The smart display system according to claim 2, wherein duplicate components are installed on the at least one DR site and an EKS cluster node group has only a single node, which can be scaled up on demand, and wherein an aurora RDS on the at least one DR site is a single AZ read replica from an aurora on an RDS Primary.

6. The smart display system according to claim 1, further comprising an On Premise System Architecture comprising a MySQL database, a Netscaler Load Balancer, an application server, a Jenkins Server and media Servers, wherein:

a NodeJS application running on the application server constantly pulls flight data from the OAG and a population within MySQL;

the Jenkins Server polls a gitlab server for change and deploy smartdisplay apps into application servers; and a Netscaler is used to distribute requests from end devices to the smartdisplay apps running on applications Servers, and Media files are served from Media Servers.

7. The smart display system according to claim 1, wherein the one or more processor controls the multiple display screens to display at least one of flight information display system (FIDS) information, gate information display system (GIDS) information, and baggage information display system (BIDS) information.

8. The smart display system according to claim 1, wherein:

the smart display system is deployed at least in part on an AWS environment; and the smart display services are integrated with an external system.

9. A smart display system for displaying content on multiple display screens, the smart display system comprising:

multiple display screens;

one or more processor operatively connected to the multiple display screens;

and at least one of a memory device and a non-transitory storage device storing computer program instructions executable on the one or more processor, wherein execution of the computer program instructions by the one or more processor configures the one or more processor to display content on the multiple display screens via:

an official airline guide (OAG) cloud connected to an AWS cloud, the AWS cloud connected to a Digital Display System module, the OAG cloud comprising OAG flight schedule data, the OAG cloud connected to an information integrator module within the AWS cloud and having Basic Auth services, wherein the AWS cloud comprises a MySQL OAG logical store connected to the information integrator module;

an Open Integration Hub having a RESTFUL API within the AWS cloud and operatively connected to the MySQL for data crud and to at least one external cloud service;

an Azure Groups module within the AWS cloud operatively connected through a crud interface to the Open Integration Hub, the Azure Groups module operatively connected to an external Azure cloud having auth and role services; and a Smart Display App module within the AWS cloud and operatively connected to the Open Integration Hub for transmitting flight data and to the Digital Display Systems module for transmitting content to the display screens, and a Smart Display Admin App within the AWS cloud for managing communications with the Azure Groups, wherein a smart data entry application permits at least two different types of user authentication comprising: one in which the smart data entry application can integrate with Azure; and another based on a database login.

10. The smart display system according to claim 9, further comprising a Smart Display System Architecture that includes a System Architecture on AWS, and an AWS infrastructure comprises a primary site and at least one disaster recovery (DR) site.

11. The smart display system according to claim 9, further comprising, installed on a primary site:

an Amazon Elastic Kubernetes Service (EKS) cluster component;

a Route 53 component providing scalable DNS service used to route incoming traffic to services running in the EKS cluster component, the Route 53 component providing DNS resolution for Kubernetes services running in the EKS cluster component, wherein end devices send a request to a request recipient component;

wherein the EKS cluster component provides a managed Kubernetes service facilitating to deployment, management, and scaling of containerized applications, wherein the EKS cluster component hosts Kubernetes resources including at least one of pods, services, and deployments, wherein EKS worker nodes are distributed across multiple AZs for high availability and fault tolerance, and services of the Smart Display App module are deployed to the EKS cluster component;

an Amazon Virtual Private Cloud (VPC) component, the VPC component is a logically isolated network within an AWS cloud that enables a user to launch AWS resources into a virtual network, wherein the VPC component provides a secure and private environment to run the EKS cluster component and RDS instance;

a Multi-AZ Aurora MySQL RDS component provides a highly available database service that automatically replicates data across multiple Availability Zones (AZs) in a region, wherein if one instance fails, traffic is automatically redirected to a standby instance without any noticeable impact to availability; and a Load Balancer component comprising said recipient component, the Load Balancer component comprising an Amazon Elastic Load Balancer (ELB) that automatically distributes incoming traffic across multiple targets to improve availability and scalability, the ELB used to distribute incoming traffic to EKS cluster component instances running smart display app services.

12. The smart display system according to claim 11, where the end devices comprise at least one of Chromeboxes and BrightSign players.

13. The smart display system according to claim 10, wherein, duplicate components are installed on the at least one DR site and an EKS cluster node group has only a single node, which can be scaled up on demand, and wherein an aurora RDS on the at least one DR site is a single AZ read replica from an aurora on an RDS Primary.

14. The smart display system according to claim 11, wherein the Route 53 component is configured with program instructions executable on a processor to provide automatic failover in case of a service outage or failure, the EKS cluster component is configured with program instructions executable on a processor to run containers in a scalable and fault-tolerant way, the VPC component is configured with program instructions executable on a processor to provide a secure and private environment to run the EKS cluster component and RDS instance, and the RDS component is configured with program instructions executable on a processor to provide automatic scale storage and compute resources as the application workload grows.

15. The smart display system according to claim 9, wherein each instance of the AWS cloud contains at least one region, and each region includes at least one VPC component, each VPC component containing multiple availability zones, each availability zone having a public subnet with an EKS worker node, and a private subnet with an Amazon RDS, the smart display system operatively connected to feed data to the public subnets, each EKS worker node feeding data to at least one private subnet, the private subnets each in operative communication with the other private subnets across regions and across clouds.

16. The smart display system according to claim 9, further comprising an On Premise System Architecture comprising a MySQL database, a Netscaler Load Balancer, an application server, a Jenkins Server and media Servers, wherein:

a NodeJS application running on the application server constantly pulls flight data from the OAG and a population within MySQL;

the Jenkins Server polls a gitlab server for change and deploy smartdisplay apps into application servers; and a Netscaler is used to distribute requests from end devices to the smartdisplay apps running on the application servers, and Media files are served from Media Servers.

17. The smart display system according to claim 9, wherein the content transmitted to the multiple display screens comprises at least one of flight information display system (FIDS) information, gate information display system (GIDS) information, and baggage information display system (BIDS) information.

18. The smart display system according to claim 9, wherein a mobile application distributed to customers permits customer access to at least a portion of the flight data in the content transmitted to the display screens.

19. The smart display system according to claim 9, wherein a limited-access mobile application permits authorized users to control at least a portion of the flight data in the content transmitted to the display screens.

20. The smart display system according to claim 9, wherein a restricted-access application permits authorized users to add emergency messaging content to the content transmitted to the display screens.

21. The smart display system according to claim 9, wherein an artificial intelligence algorithm implemented by the one or more processors accesses periodically or persistently updated data set, automatically determines from the data set events for display on the multiple display screens, and at least one of triggers or proposes messaging about the events be displayed on the multiple display screens, wherein the data set comprises at least one of the flight data, the content displayed by the multiple display screens.

22. The smart display system according to claim 21, wherein the artificial intelligence algorithm conducts at least periodic machine learning based at least in part on the data set.

23. The smart display system according to claim 1, wherein a mobile application distributed to customers permits customer access to at the flight data portion of the display content displayed on the multiple display screens.

24. The smart display system according to claim 23, wherein a limited-access mobile application permits authorized users to control at least a portion of the display content displayed on the multiple screens.

25. The smart display system according to claim 1, wherein a restricted-access application permits authorized users to add emergency messaging content to the content displayed on the display screens.

26. The smart display system according to claim 25, wherein the restricted-access application includes a one-click function comprising at least one of a generated alert content, a predefined alert content, and a representative token or button.

27. The smart display system according to claim 9, wherein an artificial intelligence algorithm implemented by the one or more processors accesses periodically or persistently updated data set, automatically determines from the data set events for display on the multiple display screens, and at least one of triggers or proposes messaging about the events be displayed on the multiple display screens, wherein the data set comprises at least one of the flight data, the content displayed by the multiple display screens.

28. The smart display system according to claim 27, wherein the artificial intelligence algorithm conducts at least periodic machine learning based at least in part on the data set.

* * * * *